US009711035B2

(12) United States Patent
Cheatham, III et al.

(10) Patent No.: US 9,711,035 B2
(45) Date of Patent: Jul. 18, 2017

(54) SYSTEMS AND METHODS FOR REPORTING VISIBILITY TO GROUND BASED IMAGING

(71) Applicant: Elwha LLC, Bellevue, WA (US)

(72) Inventors: Jesse R. Cheatham, III, Seattle, WA (US); Eun Young Hwang, Sausalito, CA (US); Roderick A. Hyde, Redmond, WA (US); Jordin T. Kare, Seattle, WA (US); Tony S. Pan, Bellevue, WA (US); Clarence T. Tegreene, Mercer Island, WA (US); Lowell L. Wood, Jr., Bellevue, WA (US); Victoria Y.H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 470 days.

(21) Appl. No.: 14/555,397

(22) Filed: Nov. 26, 2014

(65) Prior Publication Data

US 2016/0150192 A1 May 26, 2016

(51) Int. Cl.
| H04N 7/18 | (2006.01) |
| G08B 23/00 | (2006.01) |
| G06K 9/00 | (2006.01) |
| H04M 1/725 | (2006.01) |

(52) U.S. Cl.
CPC ............. *G08B 23/00* (2013.01); *G06K 9/00* (2013.01); *G06K 9/0063* (2013.01); *G06K 9/00664* (2013.01); *H04M 1/72522* (2013.01); *H04M 2250/52* (2013.01); *H04N 7/18* (2013.01)

(58) Field of Classification Search
USPC .................................................. 348/143, 159
See application file for complete search history.

(56) References Cited

U.S. PATENT DOCUMENTS

| 2008/0072284 A1 | 3/2008 | Horvitz et al. |
| 2014/0140575 A1 | 5/2014 | Wolf |
| 2015/0302858 A1 | 10/2015 | Hearing et al. |

*Primary Examiner* — Nigar Chowdhury

(57) ABSTRACT

A user's vulnerability to ground based imaging may be reported to the user. A positioning subsystem may determine a location of the user. A camera detection subsystem may determine a location of an imaging system able to view the user. A visibility determination subsystem may determine a visibility vulnerability of the user to imaging by the imaging system based on the location of the user and the location of the imaging system. The vulnerability may be determined based on an image quality capturable by the imaging system of the user, such as a spatial resolution. An output subsystem may report the visibility vulnerability to the user. The subsystems may be included in a mobile communication device or a server or may be split among the device and/or server. The output subsystem may deliver the report over a communication network and/or may display a visual representation of the report.

40 Claims, 13 Drawing Sheets

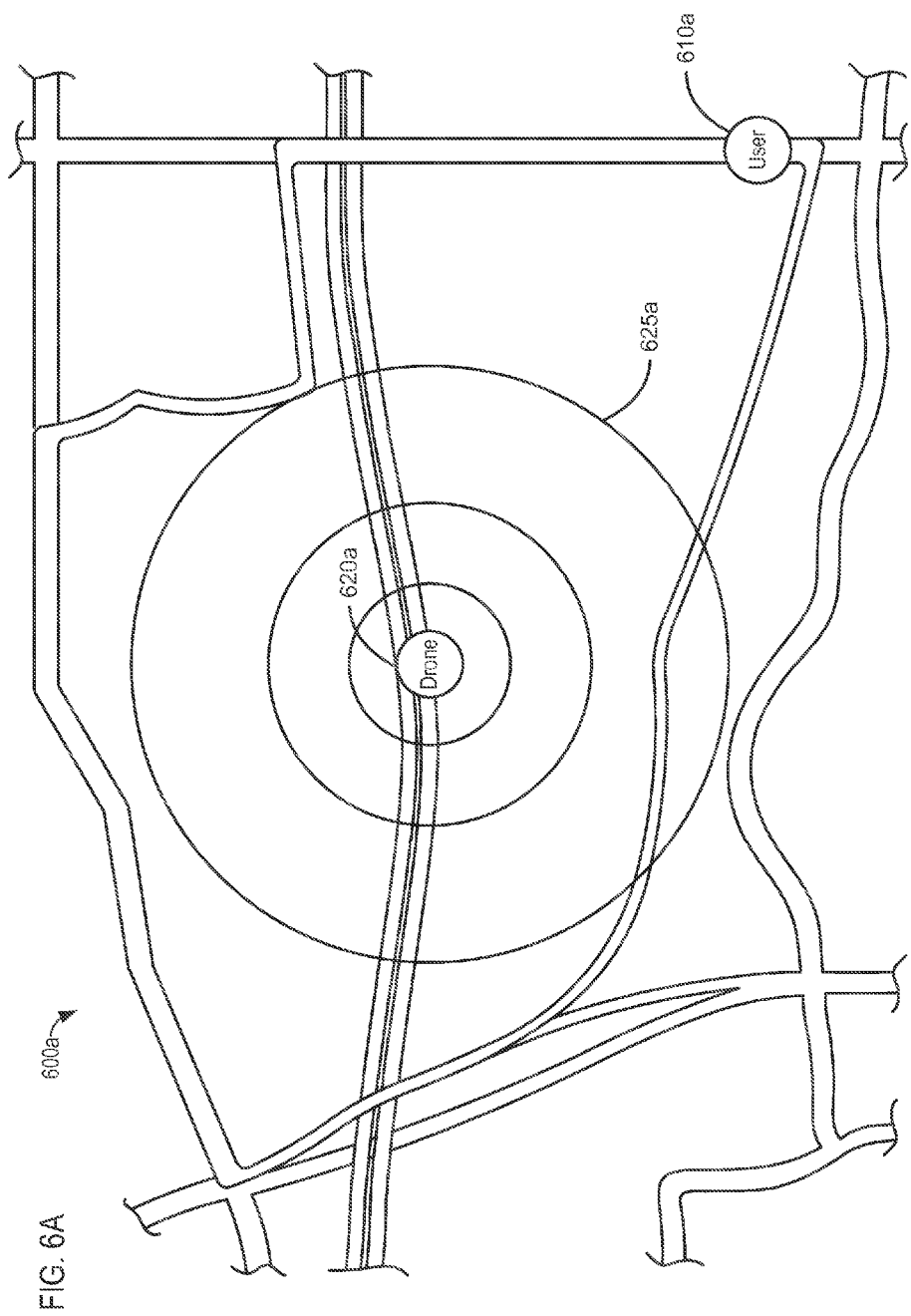

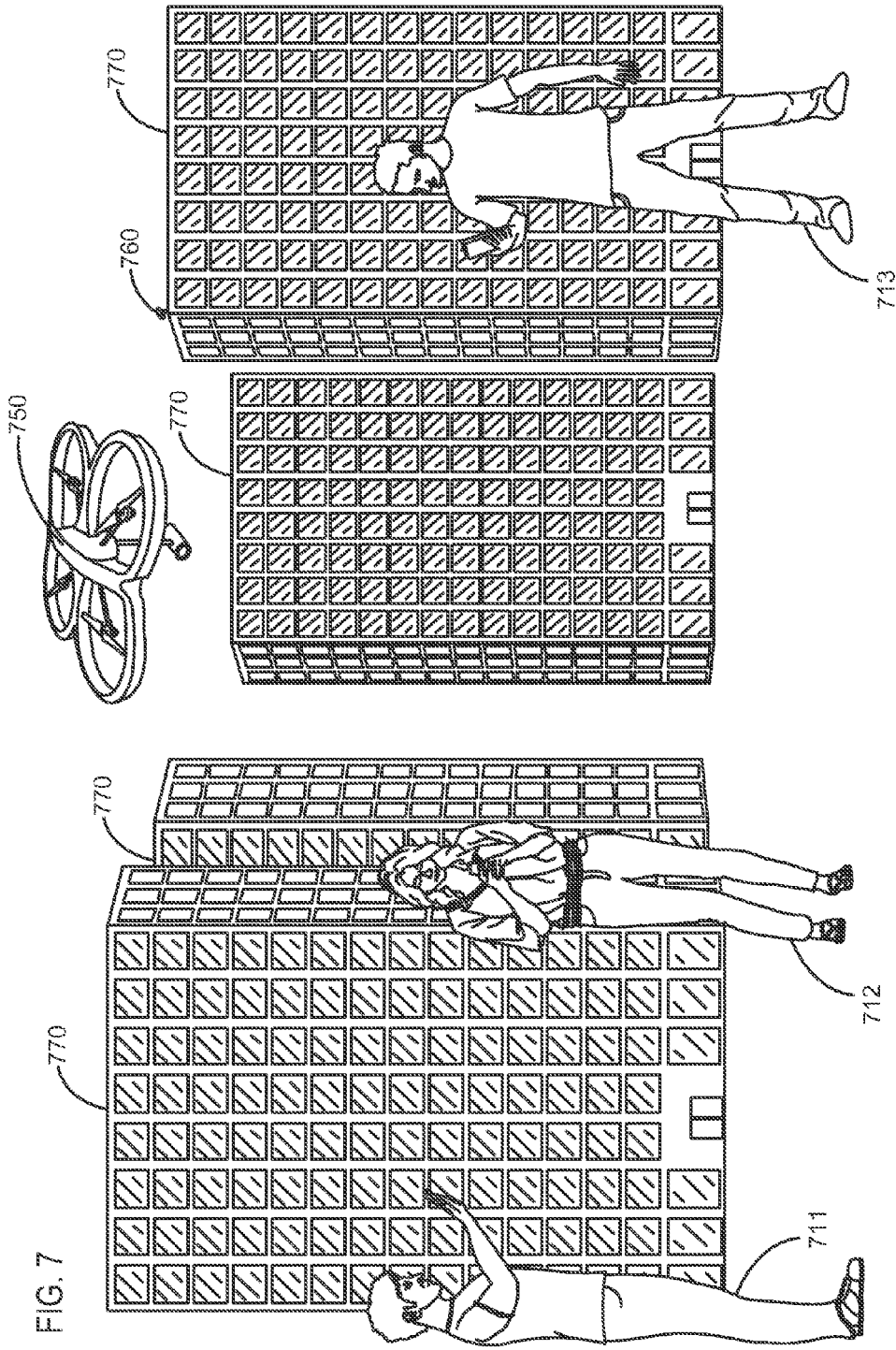

SYSTEMS AND METHODS FOR REPORTING VISIBILITY TO GROUND BASED IMAGING

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

Priority Applications

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This application relates to systems and methods for reporting visibility to drones.

SUMMARY

A system may be configured to report a user's vulnerability to ground based imaging. For example, the system may include a positioning subsystem that determines and/or monitors a location of the user. The system may also include a camera detection subsystem that detects when an imaging system is able to view the user and/or determines a location of the imaging system. Based on the location of the user, the location of the imaging system, and/or the like, a visibility determination subsystem may determine the user's visibility vulnerability to being imaged by the imaging system. The visibility vulnerability may be reported to the user, for example, using an output subsystem.

The visibility vulnerability may be based on a given level of resolution of the imaging system determined from implicit and/or explicit assumptions about the quality of the imaging system, based on the presence, range, and type of structures having views of the user, based on a viewing aspect, based on ambient lighting, based on the presence of obstructions, and/or the like. For example, a three-dimensional model of the local environment may be used to determine if the user is indoors and/or whether obstructions are present. The visibility vulnerability may be determined in real time based on a current position and/or orientation of the user. The presence and/or aiming of a camera may be detected from the natural retroreflection of the camera's focal plane array.

The visibility vulnerability may be reported by showing the user from which sites and/or directions the user is vulnerable. For example, a three-dimensional spherical plot may be used to report visibility vulnerability in all directions (e.g., using a color or radius to indicate vulnerability). The visibility vulnerability depicted may be a level of resolution for a particular camera and/or lens, a type of camera/lens needed to make user vulnerable at a particular resolution, a metric (e.g., range factor) showing an aperture-resolution product along each direction, and/or the like. The visibility vulnerability may be reported relative to an absolute space, relative to a head and/or body orientation, etc. The visibility vulnerability may be reported by displaying a virtual image of the user as seen by the imaging system including effects of resolution and viewing aspect.

The reports can be issued in response to a query, in response to a determination that predetermined criteria are met, and/or the like. For example, an alert may be issued if the user's face is visible with better than a predetermined resolution, when the user's license plate can be read, and/or the like. The alert may be conditioned to only occur at certain locations, upon certain events, at certain times of day, etc. The visibility vulnerability may be predicted based on the user's route. A duration of the future visibility vulnerability may be reported to the user (e.g., a duration when the visibility vulnerability is above a predetermined threshold). A route may be determined which increases or decreases the user's visibility vulnerability. The report may show ways to limit the user's current visibility vulnerability, such as by reporting nearby positions where user can move to reduce or eliminate visibility vulnerability, head and/or body orientations that reduce visibility vulnerability, and/or the like. The report may document vulnerability at predetermined and/or user specified times so that if a photo is received later that shows the user with a particular resolution and/or orientation, the report can be used to determine whether the imaging system could have taken the photo.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6A is a screen display of a map showing the visibility vulnerability of a user to a drone (or other imaging system) at different locations on the map.

FIG. 7 is a perspective view of a plurality of users coordinating information to determine the location of a drone, an imaging system, and/or sites from which the users may be visible.

DETAILED DESCRIPTION OF PREFERRED EMBODIMENTS

Figure 1:
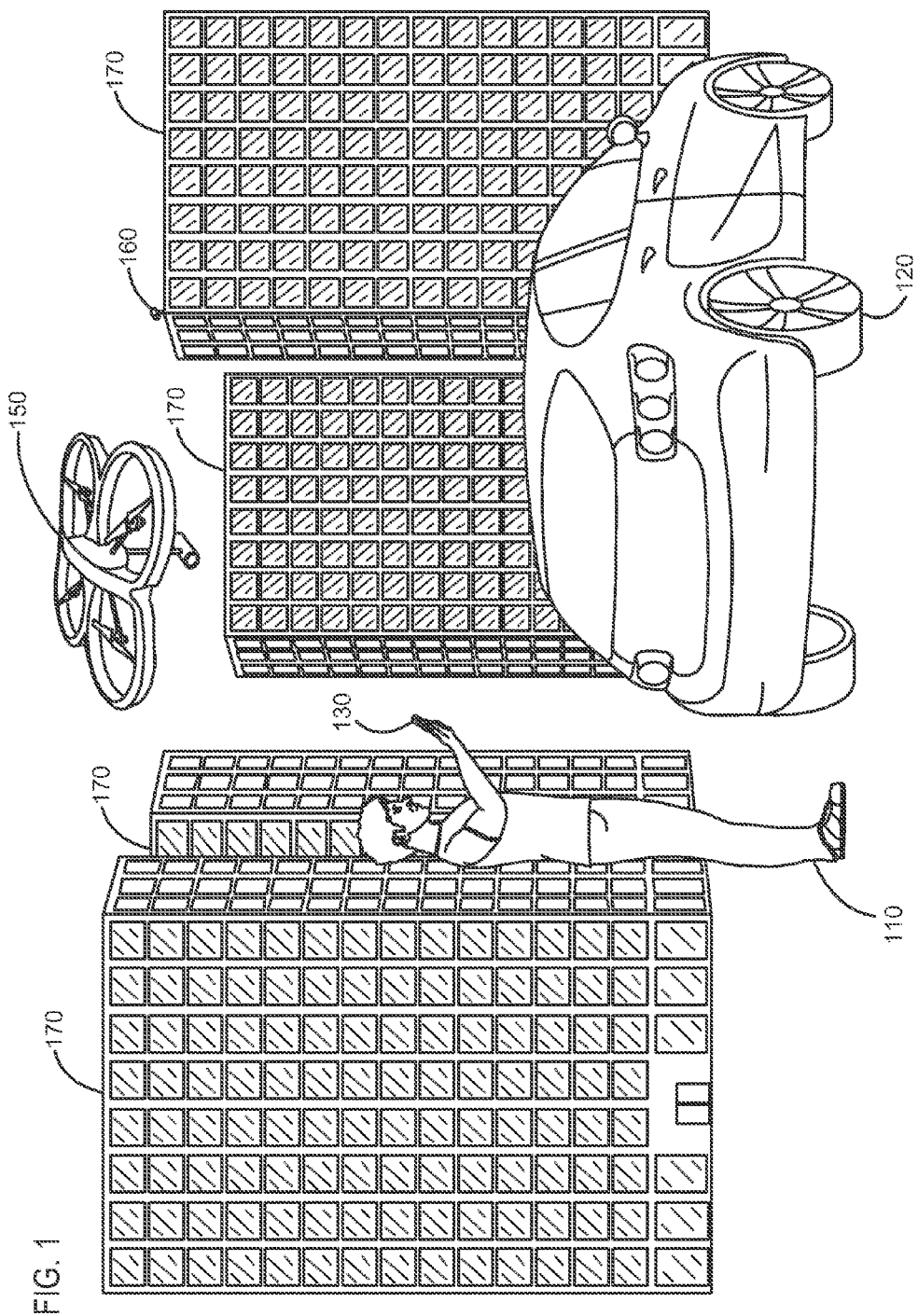
FIG. 1 is a perspective view of a system configured to report the location of a drone and/or an imaging system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Ground based imaging (e.g., by surveillance cameras, traffic cameras, etc.) is becoming ubiquitous, and aerial imaging is becoming increasingly common. For example, many public and private entities are investing in drones, such as unmanned aerial vehicles, remotely piloted vehicles, and the like. Individuals may wish to seek or avoid being imaged. For example, for privacy reasons, a person may prefer not to be imaged. However, it may be difficult for the person to know where and/or when an imaging system may be able to capture images of the person. Accordingly, the person may desire to receive indications of aerial and/or ground based imaging systems able to capture images of the person with a quality above a predetermined threshold.

A system may be configured to report vulnerability to aerial and/or ground based imaging systems (e.g., a visibility to a ground based camera, a drone camera, etc.) to a user. The system may include a positioning subsystem configured to determine a location of the user. The system may include a camera and/or drone detection subsystem configured to determine a location of an imaging system and/or a drone able to view the user. The system may include a visibility determination subsystem configured to determine a visibility vulnerability of the user to the drone and/or imaging system based on the location of the user and the location of the drone and/or imaging system. An output subsystem may be configured to report the visibility vulnerability to the user.

The visibility determination subsystem may determine the visibility vulnerability based on an image quality capturable by the imaging system (e.g., the visibility vulnerability may include the image quality). The image quality may include a spatial resolution capturable by drone and/or imaging system. The visibility determination subsystem may determine the spatial resolution based on a range from the drone and/or imaging system to the user. The visibility determination subsystem may determine the spatial resolution based on a type of camera, a type of lens, etc. of the drone and/or imaging system. The visibility determination subsystem may determine the visibility vulnerability and/or spatial resolution based on imaging capabilities of the drone and/or imaging system. For example, the imaging capabilities of the drone and/or imaging system may be known. Alternatively, or in addition, the detection subsystem may be configured to identify the type of drone and/or imaging system, and the imaging capabilities may be inferred based on the type of drone and/or imaging system.

The visibility determination subsystem may determine the visibility vulnerability based on a real-time position of the user, an orientation of the user, and/or the like. The positioning subsystem may determine the location of the user using a satellite navigation system, a signal from a transmitter with a known location, a camera, location information received from the user, an address of the user (e.g., a home address, a work address, etc.), and/or the like. The visibility determination subsystem may determine a viewing aspect of the drone and/or imaging system, and the visibility vulnerability may be determined based on the viewing aspect. The visibility determination subsystem may determine the visibility vulnerability based on an orientation of the user relative to the drone and/or imaging system. For example, the visibility vulnerability may be determined based on whether the user's face is visible. The visibility vulnerability may be determined based on an angle of elevation of the drone and/or imaging system relative to the user. The visibility vulnerability and/or image quality may be determined based on the presence of a structure having a view of the user, based on the range of such a structure, based on the type of such a structure, and/or the like. The detection subsystem may be configured to determine an orientation of a drone (e.g., a drone having a camera with a limited range of motion), an orientation of a camera on a drone, an orientation of an imaging system, etc. The detection subsystem may detect an aim of a camera and/or imaging system, for example, by detecting a retroreflection.

The visibility determination subsystem may determine the visibility vulnerability based on a lighting intensity and/or a level of ambient light. The level of ambient light may be predicted based on an angle of the sun, a time of day, and/or the like. The visibility determination subsystem may determine the visibility vulnerability based on a level of artificial illumination. The level of artificial illumination may be predicted based on a proximity to a streetlight. The visibility determination subsystem may determine the visibility vulnerability based on a weather condition, such as cloudiness, precipitation, smog, fog, and/or the like. The visibility determination subsystem may determine the visibility vulnerability based on a lighting direction (e.g., a lighting direction relative to an orientation of the user, a lighting direction relative to a direction of the user from the drone and/or imaging system, etc.). The lighting direction may be determined based on an angle of the sun, a time of day, and/or the like.

The visibility determination subsystem may determine the visibility vulnerability based on whether an obstruction is present between a lighting source (e.g., the sun) and the user, whether an obstruction is present between the drone and/or imaging system and the user, and/or the like. The obstruction may include a building, a vehicle, a tree, etc. The visibility determination subsystem may determine whether visibility of the user is obstructed due to the user being indoors. The presence of the obstruction may be determined based on a three-dimensional model of the local environment. The visibility determination subsystem may determine the vulnerability of the user to being detected by a drone and/or imaging system that is attempting to detect the user with non-visible electromagnetic radiation (e.g., using active interrogation with electromagnetic radiation to detect the user, using passive detection of electromagnetic radiation to detect the user, etc.). The non-visible electromagnetic radiation may include infrared radiation, radio frequency radiation, terahertz radiation, etc.

The visibility determination subsystem may determine the visibility vulnerability by detecting a presence of the drone and/or imaging system. The visibility determination system may detect an aim of a drone, a camera, a lens, an imaging system, and/or the like, for example, by detecting a retroreflection, visually detecting a camera and/or lens, detecting a human operator, and/or the like. The detection subsystem may determine the location of a drone based on a filed flight path. The detection subsystem may determine the location of a drone and/or imaging system using a sensor. The sensor may be a passive sensor, such as a sensor to detect electromagnetic radiation in the visible spectrum, radio frequency spectrum, or the like. The sensor may be an active sensor (e.g., radar, lidar, etc.).

The detection subsystem may receive an indication of the location of the drone and/or imaging system from a third party. The detection subsystem may access a database containing location of drones and/or imaging systems. The detection subsystem may determine the location of the drone and/or imaging system based on observation information from a plurality of third parties and/or by assembling information from a plurality of third parties. Similarly, the visibility determination subsystem may determine the visibility vulnerability based on observation information from a plurality of third parties and/or by assembling information from a plurality of third parties. The detection subsystem may receive a report from the drone and/or imaging system that indicates the location of the drone and/or imaging system.

The output subsystem may report the visibility vulnerability using a mobile communication device, by delivering a notification over a network, by delivering a notification via email, and/or the like. The output subsystem may report the visibility vulnerability by indicating at least one of a type of camera and a type of lens needed to capture the user with a predetermined or user-specified resolution. The output subsystem may report the visibility vulnerability as metrics indicative of aperture-resolution products in a plurality of directions. For example, the metrics may include a range factor. The output subsystem may report the visibility vulnerability by displaying an image indicative of a potential image quality capturable by the drone and/or imaging system. The image may include a representation of the user (e.g., an individualized representation, a generic representation, etc.). The effects of image resolution and/or viewing aspect may be depicted using the representation. For example, the representation may include a two-dimensional or three-dimensional image of the user, virtual image of the user, avatar, etc. The image may include a map indicating potential image qualities for one or more regions of the map.

The output subsystem may report a position or location of a drone, an imaging system, a site from the user is visible, and/or the like. The position may be reported from the vantage point of the user and/or from the vantage point of the drone, imaging system, and/or site. The output subsystem may report a level of visibility vulnerability from each drone, imaging system, and/or site. The output subsystem may report a range to the drone, imaging system, and/or site. The output may report directions from which the user is vulnerable and a level of visibility vulnerability from each direction. Alternatively, or in addition, the output subsystem may report a direction of the drone, imaging system, and/or site. The direction may be reported relative to an orientation of the user, relative to a head position of the user, relative to a position of the user, and/or the like.

The output subsystem may report the visibility vulnerability by displaying a plot. The plot may be a two-dimensional circular plot, a three-dimensional spherical plot, and/or the like. The visibility vulnerability may be indicated based on a color of a point on the plot, a radius of a point on the plot, and/or the like. The output subsystem may indicate the visibility vulnerability in a plurality of directions relative to the user and/or the user's orientation with the plot (e.g., a resolution to which the user is vulnerable in each direction). The plurality of directions may include at least 90° of azimuth. The output subsystem may display the plot according to a user selected resolution (e.g., the plot shows regions or contours within which a drone's image of the user is predicted to exceed a selected resolution). The output subsystem may plot the visibility vulnerability relative to an orientation of the user, based on an absolute reference space, and/or the like.

The output subsystem may report the visibility vulnerability in response to a query from the user. The output subsystem may determine whether the visibility vulnerability meets predetermined criteria and may alert the user when the predetermined criteria are met. The output subsystem may evaluate whether the predetermined criteria are met continuously, periodically, aperiodically, and/or the like. The predetermined criteria may include whether the user's face is visible to the drone, imaging system, etc. The visibility determination subsystem may simulate application of a facial recognition algorithm to imagery of the user capturable by the drone, imaging system, etc., and the predetermined criteria may include an identification accuracy of the facial recognition algorithm.

The predetermined criteria may include the drone, imaging system, etc. is within a predetermined range of the user. The predetermined criteria may include that the drone, imaging system, etc. is able to capture an image of the user with a spatial resolution above a predetermined threshold (e.g., 0.5, 1, 2, 5, 10 centimeters, etc.). The predetermine criteria may include an assessment that the imaging system is able to capture a legible image of the user's license plate. The predetermine criteria may include an assessment that no obstructions are obstructing visibility of the user. The predetermined criteria may include a criterion selected from the group consisting of a location of the user, an event, a time of day, etc. The predetermined criteria may include a type of drone, a type of imaging system, a type of camera, a type of lens, and/or the like.

The visibility determination subsystem may determine or predict future visibility vulnerability of the user to the drone and/or imaging system. The visibility determination subsystem may determine the future visibility of the user based on a route of the user, a route of the drone, and/or the like. For example, the drone detection subsystem may determine a travel direction of the drone, a flight path of the drone, and/or the like. The route of the user may be determined based on a velocity of the user, a travel direction of the user, a request for directions by the user, and/or the like. The visibility determination subsystem may determine when the user will begin being visible to the drone and/or imaging system and/or how long the user will be visible. The positioning subsystem may propose a route for the user based on the visibility vulnerability of the user. The positioning subsystem may select the route to increase or decrease the visibility vulnerability of the user. An input subsystem may receive a request from the user for a location and/or a time when the user's visibility vulnerability will be above or below a specified value.

The output subsystem may report one or more ways for the user to decrease the user's visibility vulnerability. The output subsystem may indicate positions and/or orientations with decreased visibility vulnerability and the visibility vulnerability of the reported positions and/or orientations. The visibility determination subsystem may document the visibility vulnerability of the user. The visibility vulnerability may be documented continuously, periodically, aperiodically, at user specified times, etc. The visibility determination subsystem may be configured to compare an image to the documented visibility vulnerability to determine if the image could have been taken by the drone and/or imaging system at an indicated time. The output subsystem may report a history of the visibility vulnerability of the user (e.g., a best spatial resolution at each time the user was visible).

In some embodiments, the drone's position and/or flight path may be known. The flight path may be provided (e.g., reported) by the drone, may be measured by a third party, and/or the like. For example, a service can tell subscribers when a drone is close enough to capture images of those subscribers. The service can issue warnings based on address, place of work, real time position, etc. The warnings may be issued only during user requested time intervals or locations (e.g., only warn the user when the user cares enough about privacy to pay for it). The warnings may be based on the type of drone (e.g., police drones may be treated differently than news or commercial drones).

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers; computer programming tools and techniques; computer networks and networking technologies; digital storage media; authentication; access control; and other security tools and techniques provided by public keys, encryption, firewalls, and/or other means.

A subsystem may include a processor, a software module stored in a memory and configured to operate on the processor, a communication interface, sensors, user interface components, and/or the like. The components in each subsystem may depend on the particular embodiment (e.g., whether the system directly measures data or acquires the data from a third party). It will be apparent to those of skill in the art how to configure the subsystems consistent with the embodiments disclosed herein.

FIG. 1 is a perspective view of a system 130 configured to report the location of a drone 150 and/or an imaging system 160. A user 110 may be interested in receiving reports of the location of the drone 150 and/or the imaging system 160 when the user 110, the user's vehicle 120, and/or the like is visible to the drone 150 and/or the imaging system 160. The system 130 may be configured to report the position of the drone 150 and/or the imaging system 160, the orientation, and/or the like. Alternatively, or in addition, the system may report sites 170 from which the user may be visible. In the illustrated embodiment, a mobile communication device (e.g., a smart phone, a feature phone, etc.) may include the system 130. In other embodiments, the system 130 may be a separate device, and/or the system 130 may be independent of a mobile communication device but send the report to the mobile communication device.

Figure 2A:
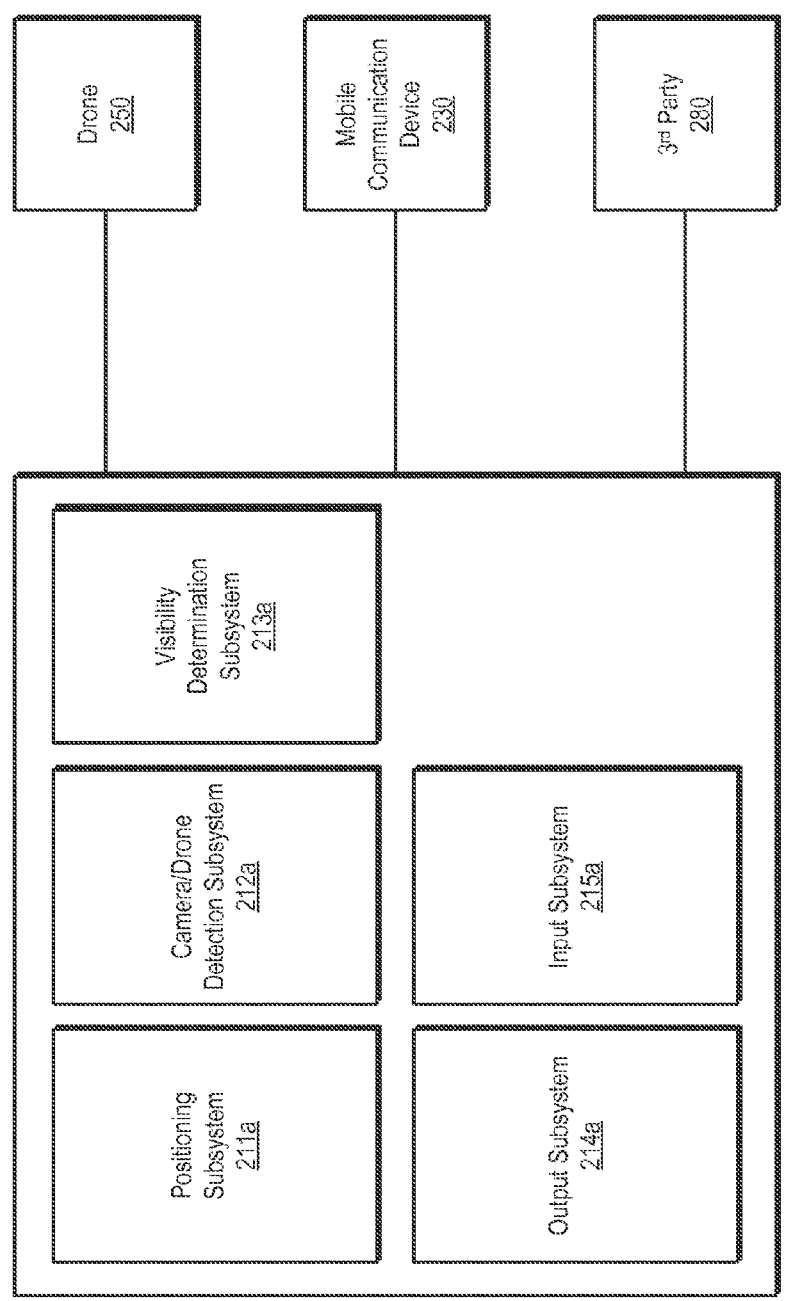
FIG. 2A is a schematic diagram of an embodiment of a system for reporting a location of a drone to an independent mobile communication device.

FIG. 2A is a schematic diagram of an embodiment of a system 200a for reporting a location of a drone 250 to an independent mobile communication device 230. The system 200a may include a positioning subsystem 211a configured to determine a location and/or an orientation of the user. The positioning subsystem 211a may include a device for determining geodetic location of a user (e.g., a satellite navigation system, a land-based navigation system, etc.), a compass for determining orientation of the user, and/or the like. Alternatively, or in addition, the positioning subsystem 211a may receive an indication of an address (e.g., a home address, a work address, etc.) from a memory, a communication interface, and/or the like. The mobile communication device 230 may determine its location and provide it to the positioning subsystem 211a (e.g., via a communication interface), and/or the positioning subsystem 211a may determine the location of the mobile communication device.

A camera/drone detection subsystem 212a may be configured to determine a location of a drone 250 and/or an imaging system (not shown) able to view the user. The camera/drone detection subsystem 212a may be configured to sense the location, to receive an indication of the location from the drone 250 and/or imaging system, to receive an indication from a third party 280, and/or the like. For example, the third party 280 may include a plurality of third parties, and the camera/drone detection subsystem 212a may aggregate information about the location of the drone 250 and/or imaging system from the plurality of third parties. The camera/drone detection subsystem 212a may only include drones 250 and/or imaging systems that it can sense, may only request drones 250 and/or imaging systems within a predetermined distance of the user, and/or the like. The camera/drone detection subsystem 212a may explicitly determine which drones 250 and/or imaging systems are able to view the user or may obtain a rough estimate to be further refined by the visibility determination subsystem 213a.

The visibility determination subsystem 213a may determine a visibility vulnerability of the user. In some embodiments, the visibility determination subsystem 213a may receive a location of the drone 250 and/or imaging system from the camera/drone detection subsystem 212a and may determine the imaging capabilities of the drone 250 and/or imaging system. The visibility determination subsystem 213a may be configured to identify the drone 250 and/or imaging system to determine its capabilities. Alternatively, or in addition, the visibility determination subsystem 213a may receive an indication of the identity of the drone and/or imaging system and/or an indication of its capabilities from the third party 280 (e.g., a plurality of third parties). The visibility determination subsystem 213a may provide a plurality of visibility vulnerabilities corresponding to different possible capabilities of the drone 250 and/or imaging system without determining the precise capabilities of the drone 250 and/or imaging system.

An output subsystem 214a may report the visibility vulnerability to the user. The output subsystem 214a may include or be coupled to a communication interface configured to send the report of the visibility vulnerability to the mobile communication device 230. For example, the output subsystem 214a may email the report to the user, may send an SMS/MMS message indicative of the report, may send the report to an application operating on the mobile communication device, and/or the like. The output subsystem 214a may include a monitor, a printer, and/or the like for directly indicating the report to the user. The output subsystem 214a may provide a real-time vulnerability alert to the user by delivering a visual, auditory, or haptic warning that the user's visibility vulnerability exceeds a predetermined threshold. In some embodiments, this warning may provide a single bit of information (e.g., flash a light, deliver a buzzing sound, vibrate, etc.) letting the user know he is vulnerable. In other embodiments, the warning provides more information such as the direction from which he is vulnerable (e.g., conveyed by the direction of a visual or auditory warning, the location at which a vibration is applied, etc.). In yet other embodiments, the warning may include a visual or audio message conveying more detailed information, such as the time or duration of the vulnerability, the level of vulnerability relative to the predetermined threshold, or the like. An input subsystem 215a may receive requests from the user, e.g., for reports about visibility vulnerability. The input subsystem 215a may be coupled to a communication interface configured to receive requests from the mobile communication device 230. Alternatively, or in addition, the input subsystem may include a mouse, a keyboard, a touch screen, and/or the like for directly receiving requests from the user.

Figure 2B:
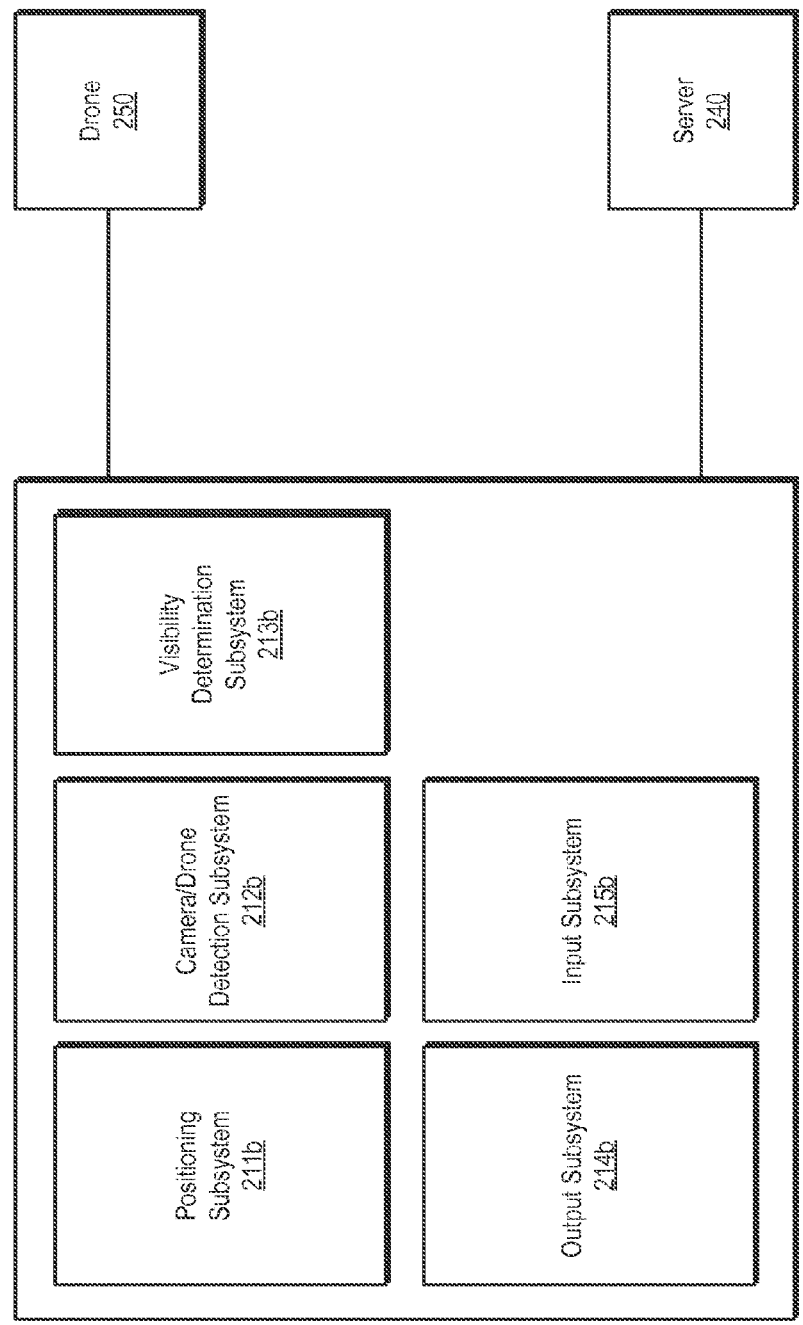
FIG. 2B is a schematic diagram of an embodiment of a system for reporting a location of a drone to a user.

FIG. 2B is a schematic diagram of an embodiment of a system 200b for reporting a location of a drone 250 to a user. In some embodiments, a mobile communication device may include the system 200b. The system 200b may include a positioning subsystem 211b. The positioning subsystem 211b may be configured to determine a location and/or orientation of the system 200b and/or a user of the system 200b. For example, the positioning subsystem may include a satellite navigation system, a system for determining a location of a mobile communication device based on a location of a ground based transmitted coupled to the mobile communication device, a compass, and/or the like. Alternatively, or in addition, the positioning subsystem 211b may retrieve an address, e.g., from a server 240 and/or a local persistent storage device (not shown).

The system 200b may also include a camera/drone detection subsystem 212b and/or a visibility determination subsystem 213b. The camera/drone detection subsystem 212b may determine the location of the drone 250 and/or the imaging system, and the visibility determination subsystem 213b may determine a visibility vulnerability of the user. The camera/drone detection subsystem 212b and/or the visibility determination subsystem 213b may include local sensors for measuring the location of the drone 250 and/or the imaging system and/or identifying the capabilities of the drone 250 and/or the imaging system. Alternatively, or in addition, the server 240 may determine the location and/or capabilities of the drone 250 and/or the imaging system. The camera/drone detection subsystem 212b and/or the visibility determination subsystem 213b may use a communication interface to receive the location and/or capabilities from the server.

The system 200b may include an output subsystem 214b and/or an input subsystem 215b. For example, if a mobile communication device includes the system 200b, the output subsystem 214b and/or the input subsystem 215b may include or communicate with user interface components of the mobile communication device (e.g., a touch screen, a keyboard, etc.). Alternatively, or in addition, the output subsystem 214b and/or the input subsystem 215b may include a communication interface.

Figure 3:
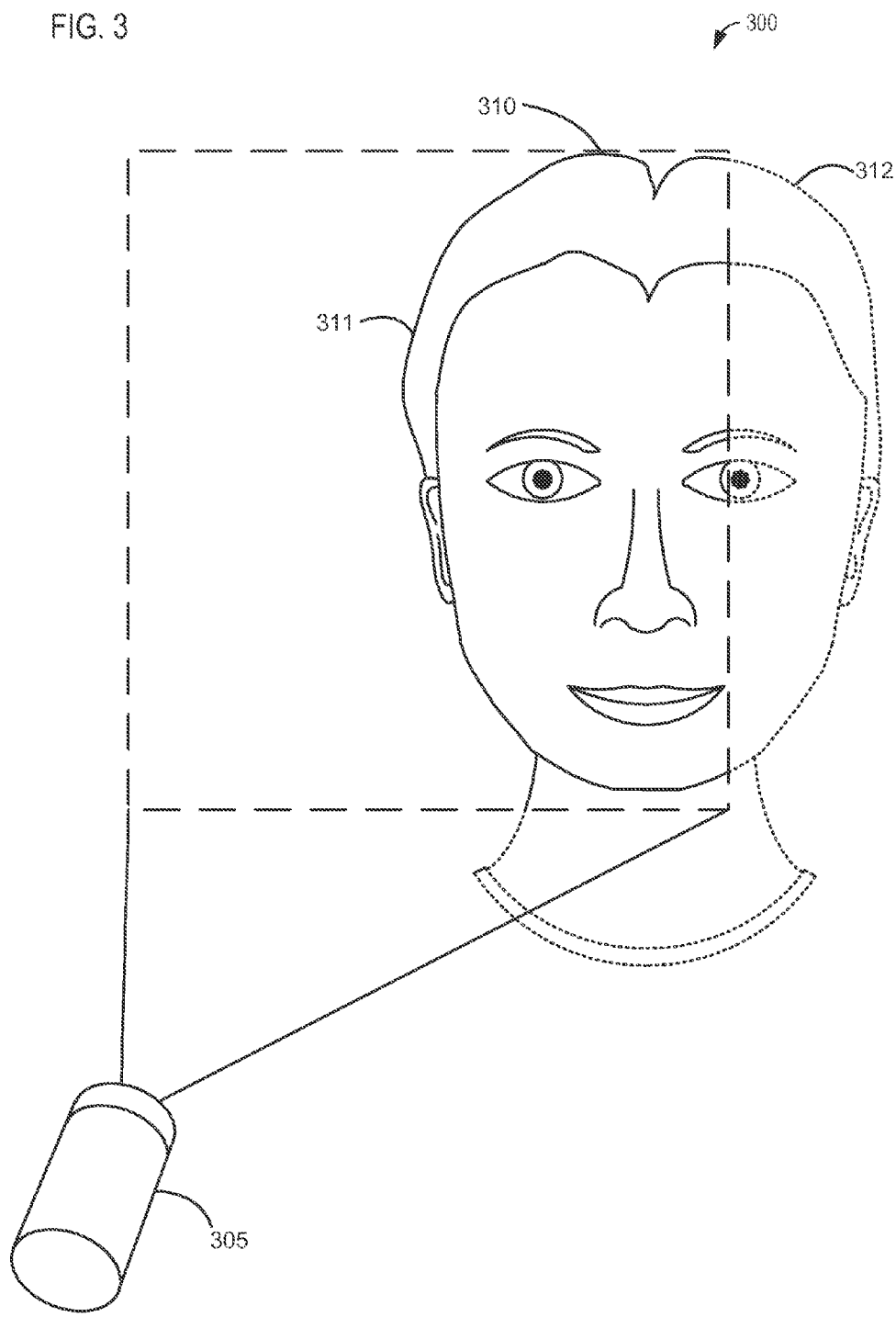
FIG. 3 is a screen display depicting a user's visibility vulnerability to imaging by a camera.

FIG. 3 is a screen display 300 depicting a user's visibility vulnerability to imaging by a camera 305. The camera 305 may be a drone camera and/or an imaging system camera and may be illustrated in the screen display 300. The screen display 300 may also include a representation of the user 310. For example, the illustrated representation 310 may include a depiction of the user's face. Alternate representations may include the user's body. The representation 310 may include a first part 311 representing a portion of the user's face that is visible to the camera 305 and a second part 312 representing a portion of the user's face that is not visible to the camera 305. The first part 311 may be depicted with solid lines to indicate that it is visible, and the second part 312 may be depicted with dashed or dotted lines to indicate that it is not visible.

Alternatively, or in addition, the resolution capturable by the camera 305 may be depicted. For example, the first part 311 may be displayed with a high resolution corresponding to the resolution capturable by the camera of the first portion of the user's face, and the second part 312 may be displayed with a low resolution corresponding to the resolution capturable by the camera of the second portion of the user's face. The resolution may vary for different portions of the user's face or may be the same for the entire face.

Figure 4:
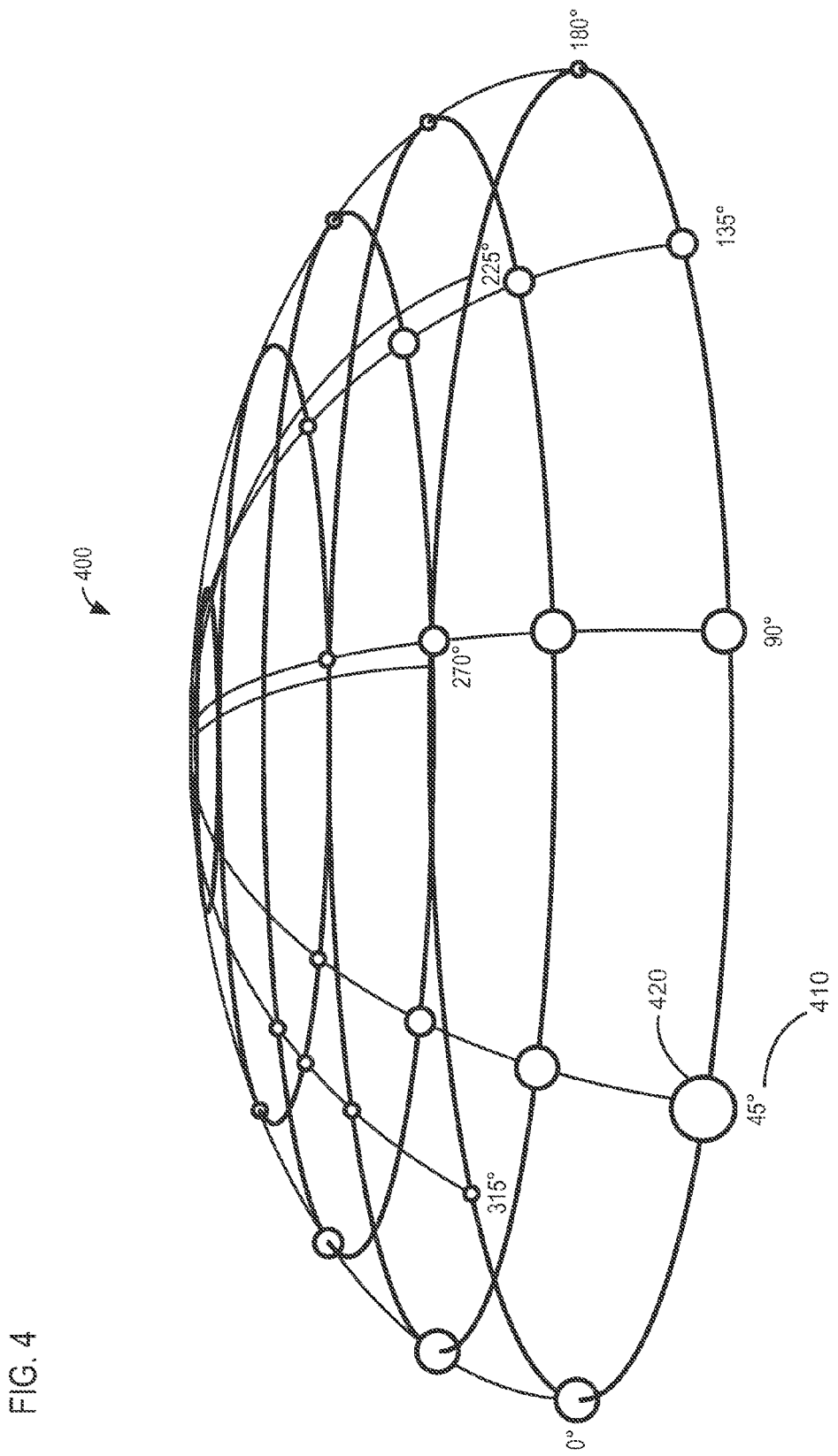
FIG. 4 is a screen display depicting a plot of the user's visibility vulnerability to a drone and/or an imaging system.

FIG. 4 is a screen display 400 depicting a plot of the user's visibility vulnerability to a drone and/or an imaging system. The plot may indicate the user's visibility vulnerability for a single drone and/or imaging system and/or for a plurality of drones and/or imaging systems (e.g., any drones and/or imaging systems of which the device producing the display 400 is aware). The plot may include a three-dimensional spherical and/or hemispherical grid that illustrates the user's visibility vulnerability in a plurality of directions 410. For example, the grid may be divided into a plurality of azimuths and elevations. In the illustrated embodiment, the grid has an azimuthal resolution of 45 degrees. Points 420 at each grid intersection may indicate the user's visibility vulnerability in that direction. For example, the size and/or color of each point 420 may correspond to the visibility vulnerability of the user. Thus, a user may be able to quickly look at the plot and determine which directions to face and/or travel to seek or avoid being visible to a drone and/or imaging system.

Figure 5A:
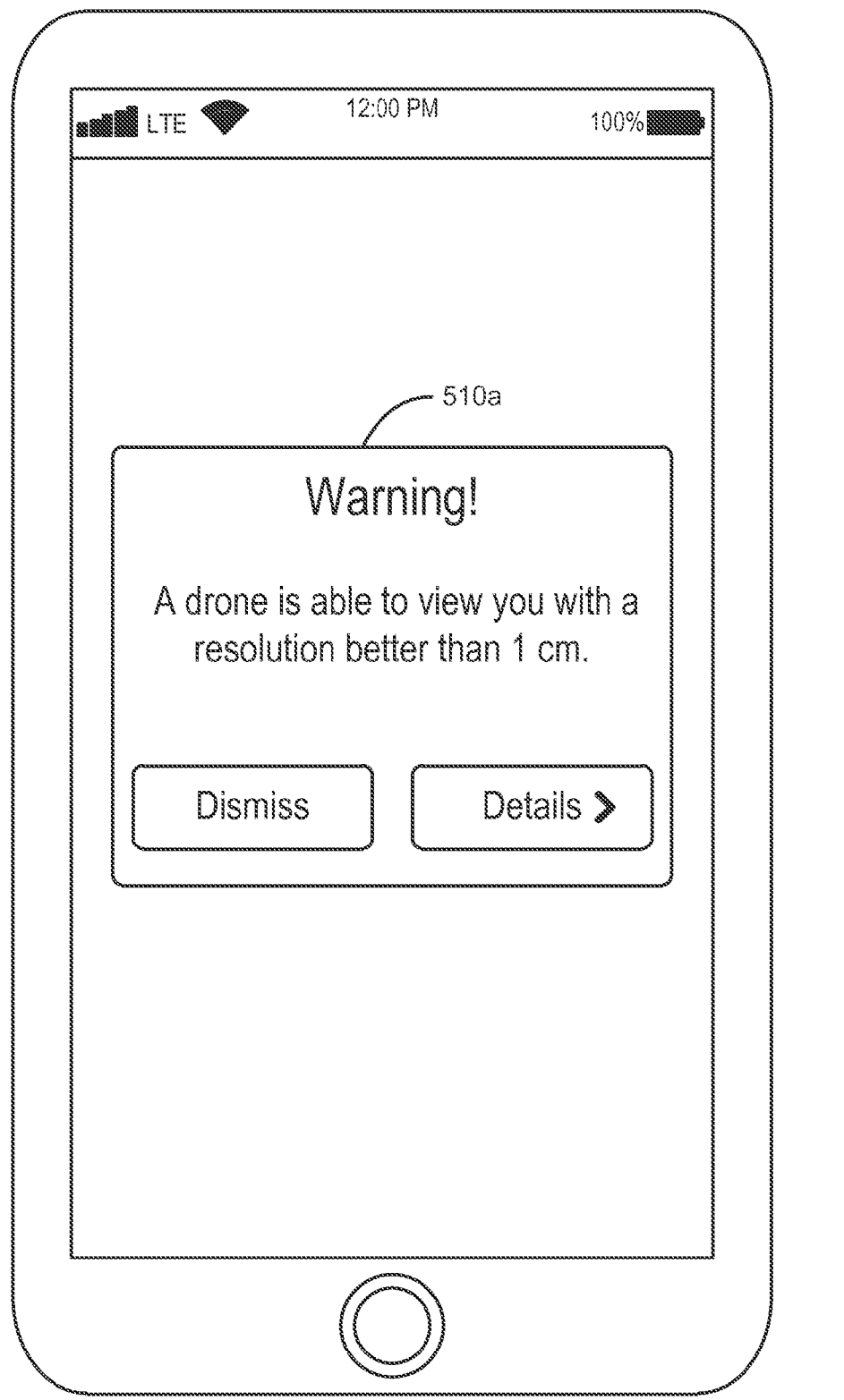
FIG. 5A is a mobile communication device displaying a message indicating a user's visibility vulnerability to a drone and/or an imaging system.

FIG. 5A is a mobile communication device 500a displaying a message 510a indicating a user's visibility vulnerability to a drone and/or an imaging system. The mobile communication device 500a may alert a user when the user's visibility vulnerability satisfies predetermined criteria, such as user selected criteria. The mobile communication device 500a may determine the user's visibility vulnerability and/or whether the visibility vulnerability satisfies the predetermined criteria. Alternatively, or in addition, the mobile communication device 500a may receive an indication of the user's visibility vulnerability and/or an indication that the predetermined criteria are satisfied from a remote device. In the illustrated embodiment, the message 510a indicates that a drone is able to view the user with a resolution better than a predetermined threshold. The user may then be able to take action to mitigate the user's visibility vulnerability.

Figure 5B:
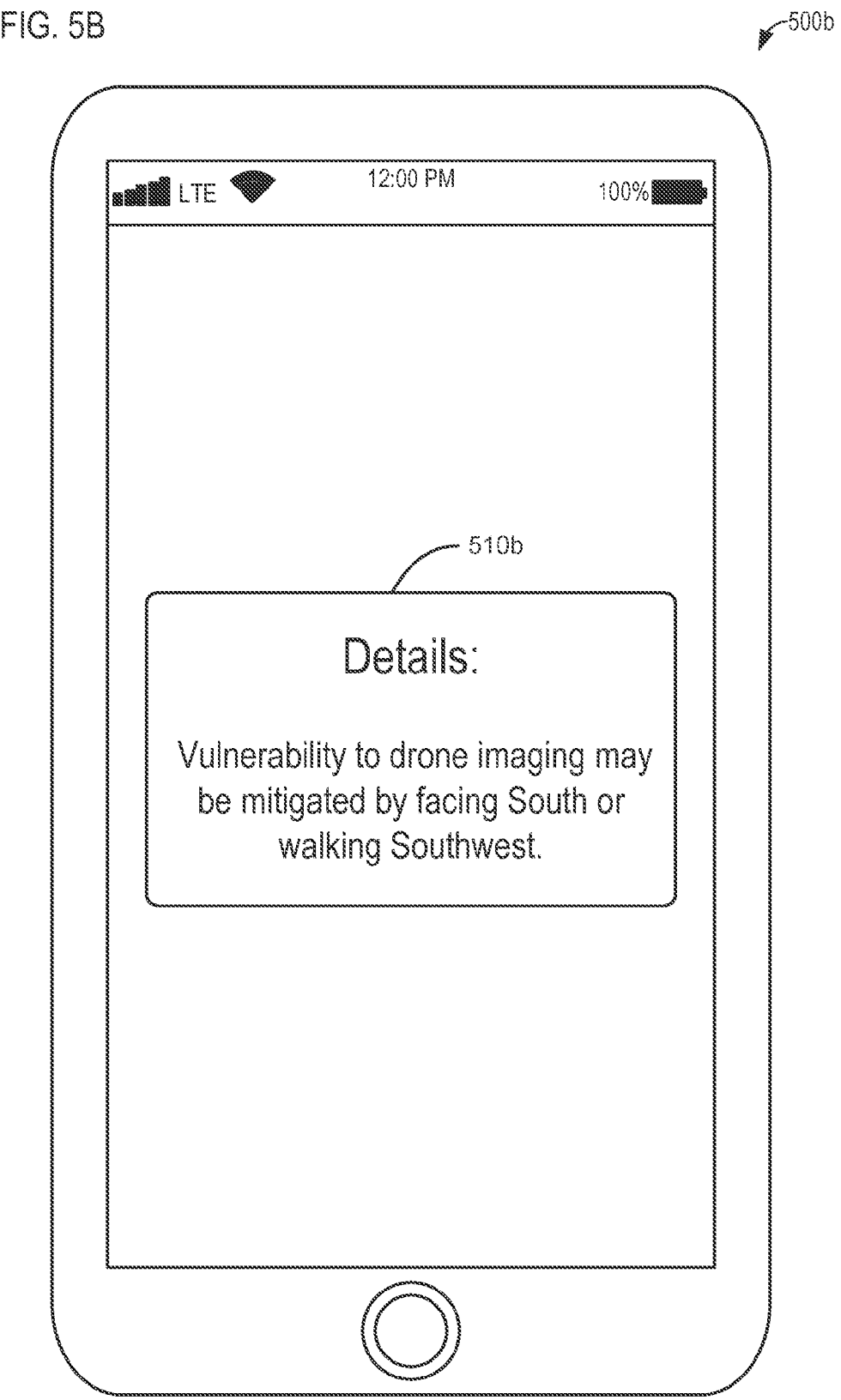
FIG. 5B is a mobile communication device displaying a message indicating how a user can mitigate the user's visibility vulnerability.

FIG. 5B is a mobile communication device 500b displaying a message 510b indicating how a user can mitigate the user's visibility vulnerability. The user may have requested the information on how to mitigate visibility vulnerability. Alternatively, or in addition, the information on how to mitigate visibility vulnerability may be provided in response to a query for the user's visibility vulnerability by the user or in response to a determination that the user's visibility vulnerability satisfies predetermined criteria. In the illustrated embodiment, the message 510b may indicate an orientation the user can face and/or a direction the user can travel to mitigate the user's visibility vulnerability. The orientation and the direction may match or may be different and may be determined based on the location of the imaging system, the direction of travel and/or speed of the imaging system, locations and/or velocities of nearby obstructions, and/or the like.

FIG. 6A is a screen display of a map 600a showing the visibility vulnerability of a user 610a to a drone 620a (or other imaging system) at different locations on the map 600a. The map 600a may include an indication of a location of the user 610a and an indication of a location of a drone 620a. The map 600a may also include indications of visibility vulnerability 625a for various portions of the map 600a. For example, in the illustrated embodiment, the indications of visibility vulnerability 625a may include concentric circles centered on the drone 620a. The concentric circles may indicate boundaries inside of which the visibility vulnerability (e.g., a spatial resolution) is above a predetermined threshold. In alternate situations, the indications of visibility vulnerability 625a may not be concentric circles because, for example, obstructions are present, a camera has a limited range of motion, an orientation of the camera is known, etc. The map 600a may include indications of the direction and/or speed of the user 610a and/or the drone 620a, such as arrows, (not shown) and/or may refresh frequently enough for the direction and/or speed to be determined based on movement of the indications of the user 610a and/or the drone 620a on the map 600a.

Figure 6B:
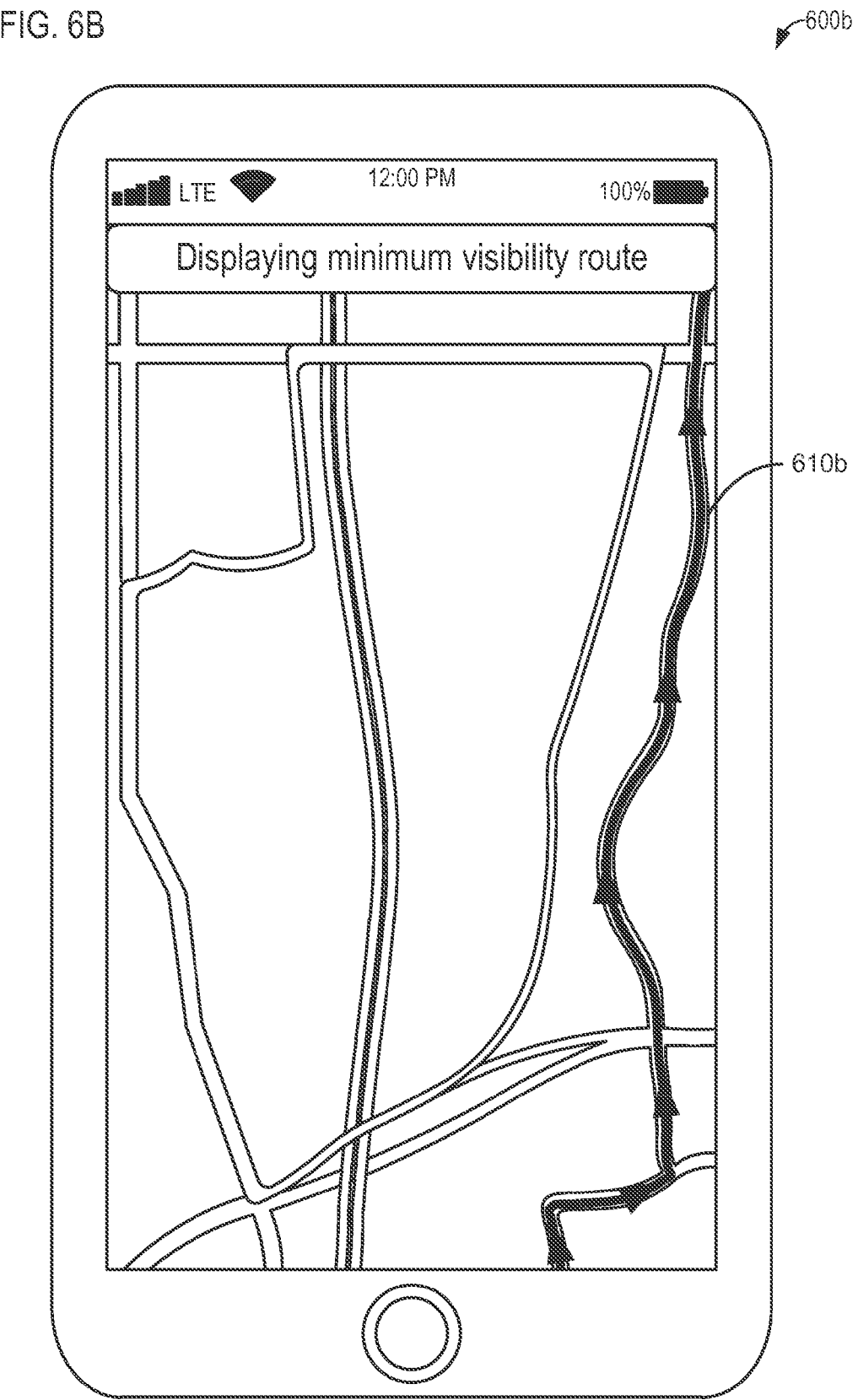
FIG. 6B is a mobile communication device displaying a map with a minimum visibility route highlighted.

FIG. 6B is a mobile communication device 600b displaying a map with a minimum visibility route 610b highlighted. For example, the mobile communication device 600b may determine a location of a user, e.g., using a satellite navigation system. Based on the user's location and a location of a destination, the mobile communication device 600b may be configured to compute one or more routes that the user can travel from the user's location to the destination. The mobile communication device 600b may also be configured to determine or receive an indication of the user's visibility vulnerability at various points along the route at the time when the user will arrive at those points. The mobile communication device 600b may then determine a route 610b for which visibility vulnerability will minimized or maximized. For example, the visibility vulnerability may be used to weight various travel segments when determining the route 610b. The mobile communication device 600b may determine a route that optimizes visibility vulnerability and/or balances tradeoffs between visibility vulnerability and travel time. The minimum visibility route 610b may be a route with a smallest average visibility vulnerability, a route with a smallest maximum visibility vulnerability, and/or the like.

FIG. 7 is a perspective view of a plurality of users 711,712,713 coordinating information to determine the location of a drone 750, an imaging system 760, and/or sites 770 from which the users 711-713 may be visible. It may be difficult for an individual user 711-713 to determine the location of the drone 750, imaging system 760, and/or sites 770. Each user 711-713 may be able to easily calculate and/or measure the user's own location, the direction of the drone 750, imaging system 760, and/or sites 770 from the user, and/or the elevation angle of the drone 750, imaging system 760, and/or sites 770 from the user but may have difficulty calculating and/or measuring the distance to the drone 750, imaging system 760, and/or sites 770. However, the locations, directions, and elevation angles determined by multiple of the users 711-713 may be used to triangulate the location and/or elevation of the drone 750, imaging system 760, and/or sites 770. Each user 711-713 may have a mobile communication device that may transmit the locations, directions, elevation angles, and/or time of measurement/calculation to other users 711-713 and/or to a server (not shown) for distribution to other users.

Figure 8:
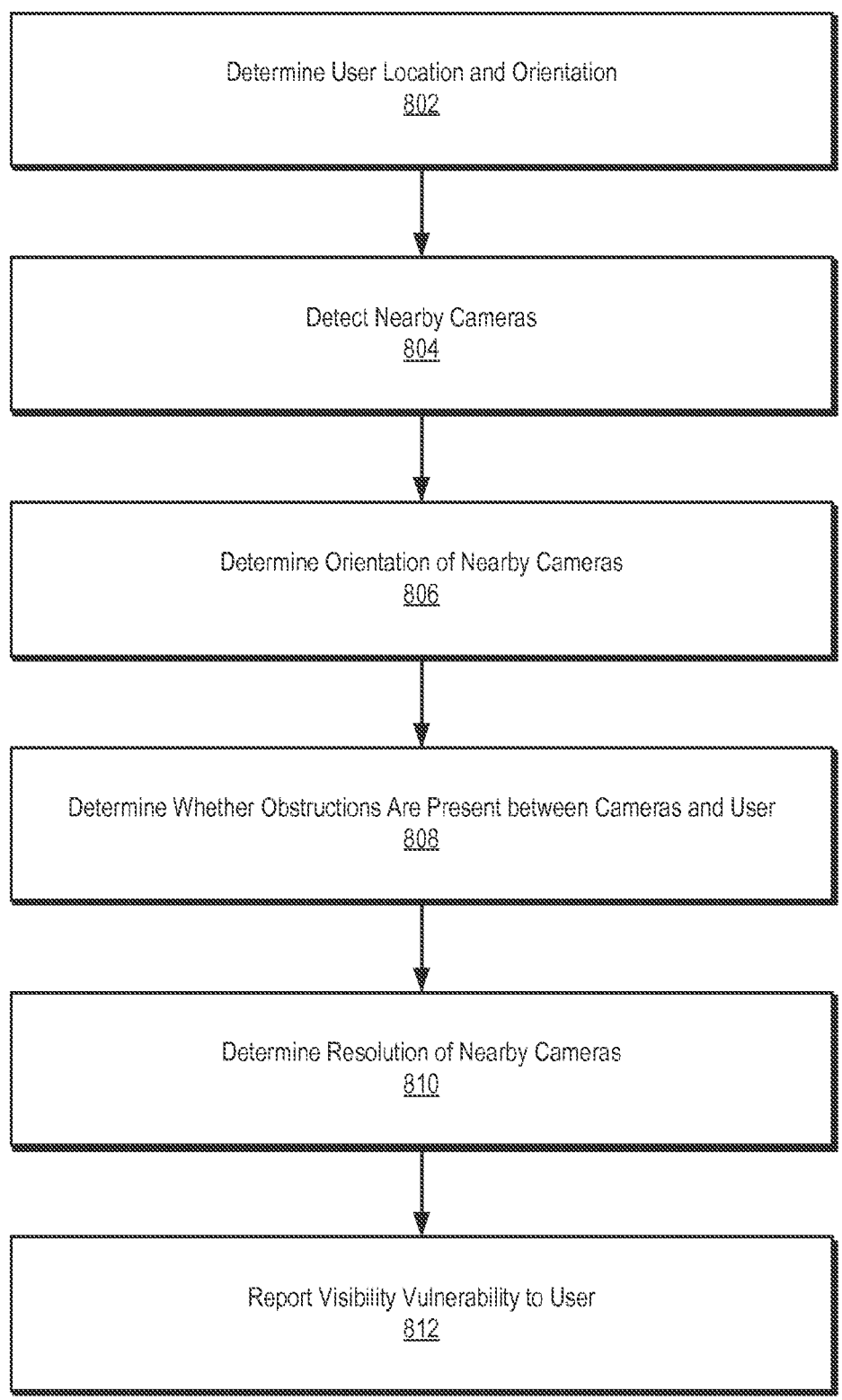
FIG. 8 is a flow diagram of a method for determining and reporting a user's visibility vulnerability to the user.

FIG. 8 is a flow diagram of a method 800 for determining and reporting a user's visibility vulnerability to the user. The method 800 may begin with determining 802 a location and/or an orientation of the user. For example, the location may be determined 802 using a satellite navigation system, a signal from a transmitter with a known location, a camera, location information received from the user, an address of the user (e.g., a home address, a work address, etc.), and/or the like. The orientation may be the orientation of the user's head, the user's body, a device held by the user, etc. The orientation may be determined 802 using a compass, a directional transmitter and/or receiver, and/or the like. The location and/or orientation may be received from one or more device configured to determine the location and/or orientation.

The method 800 may include detecting 804 nearby cameras. Nearby cameras may be detected 804 by detecting retroreflection from the cameras, by visually detecting cameras, by detecting drones carrying the cameras, by wirelessly communicating with the cameras, etc. Detecting 804 the nearby cameras may include determining their location. The orientation of the nearby cameras may be determined 806 as well. For example, the orientation may be detected from the retroreflection, visually, from drone orientation, by wirelessly communicating with the camera, etc.

The method 800 may also include determining 808 whether obstructions are present between the cameras and the user. The locations of obstructions may be determined 808 by receiving indications of their locations from a third party (e.g., a mapping service, a satellite mapping service, etc.). Because the locations of the user and/or the cameras may be known, the locations of obstructions may be used to determine whether the obstructions are between the cameras and the user. For example, locations and/or areas which may possibly obstruct visibility of the user may be indicated to the third party, and the third party may provide indications of possible obstructions at the indicated locations and/or areas. The possible obstructions may be evaluated to determine whether they do in fact obstruct visibility of the user.

The resolution of the nearby cameras may be determined 810. The resolution may be the best possible resolution capturable, the resolution capturable of the user, etc. The resolution may be determined based on a model of a camera, based on a model of a drone, based on a distance of the camera from the user, by wirelessly communicating with the camera, and/or the like. The location and/or orientation of the nearby cameras, the presence of obstructions, the resolution of the nearby cameras, and/or the like may be used to determine a visibility vulnerability, which may be reported 812 to a user. The visibility vulnerability may be the vulnerability to a camera with a best view of the user, the average vulnerability across multiple cameras, a sum of vulnerabilities for multiple cameras (e.g., a weighted sum with diminishing returns), and/or the like. The visibility vulnerability may be transmitted to the user over a communication network (e.g., via email, to a dedicated application, etc.), may be displayed to the user on an output device, may be provided as an audio or haptic alert, and/or the like. The visibility vulnerability may be displayed as a virtual representation of the user, a plot, a map, text, and/or the like. The method 800 may be performed in various orders in different embodiments.

Figure 9:
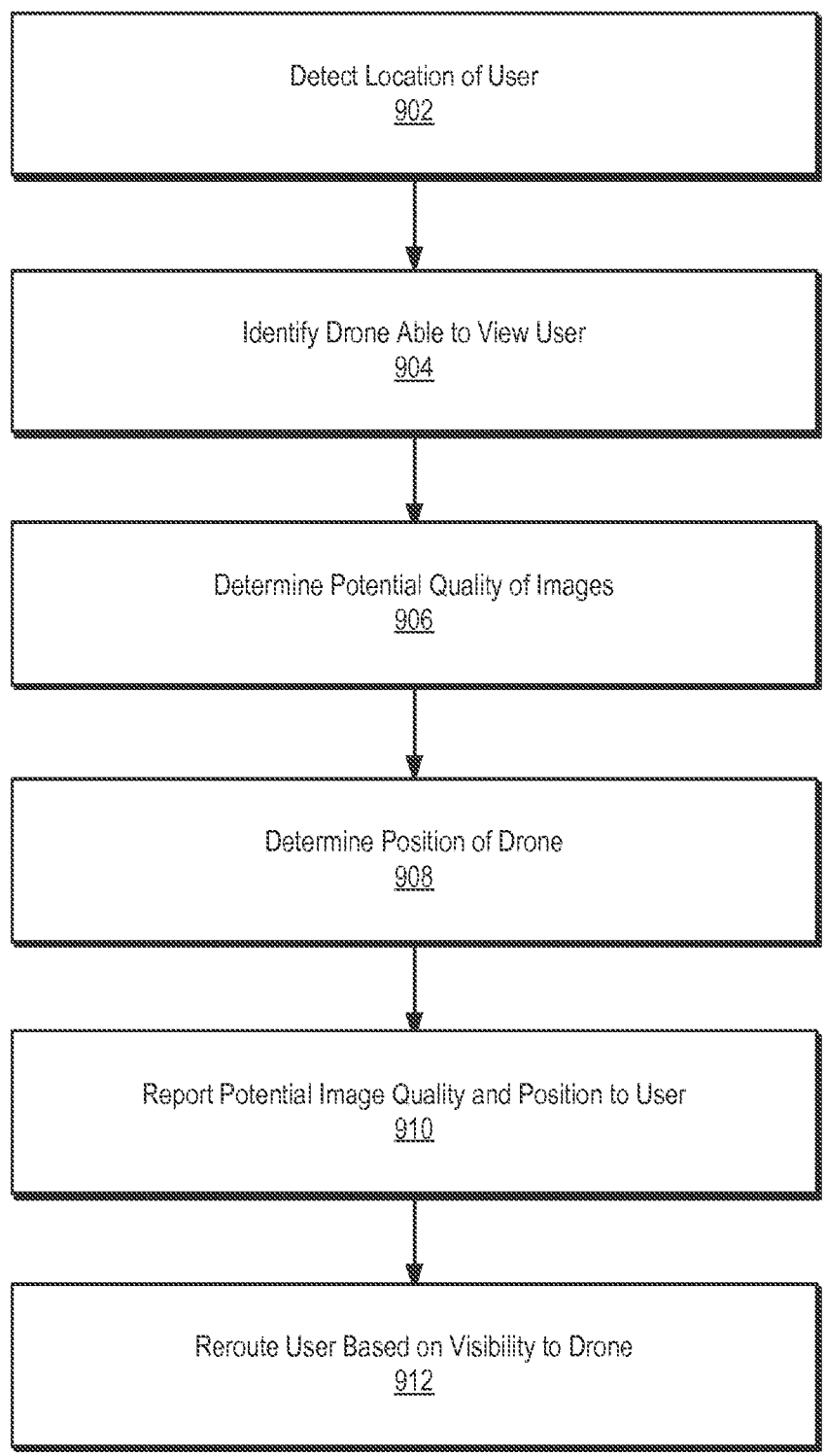
FIG. 9 is a flow diagram of a method for rerouting a user susceptible to imaging by a drone.

FIG. 9 is a flow diagram of a method 900 for rerouting a user susceptible to imaging by a drone. The method 900 may begin with detecting 902 a location of the user. The location of the user may be detected 902 by measuring the location of the user, by receiving an indication of the location of the user from another device or application, and/or the like. The method 900 may also include identifying 904 a drone able to view the user. Identifying 904 may include detecting the drone, receiving an indication of the drone (e.g., from the drone, from third party, etc.), and/or the like.

The potential quality of images capturable by the drone may be determined 906. The potential quality may include a visibility vulnerability of the user to the drone, a resolution capturable by the drone of the user, which portions of the user are capturable, lighting or weather effects on quality, and/or the like. The position of the drone may also be determined 908, for example, by measuring it, by receiving an indication of it, and/or the like. The orientation, speed, velocity, planned route, etc. of the drone may be determined in addition to, or instead of, the position. Identifying 904 the drone may include determining 906 the potential image quality capturable by it and/or determining 908 its position. For example, a single communication from the drone, a third party, a sensor, and/or the like may include all the necessary information.

In some embodiments, the potential image quality and/or position of the drone may be reported 910 to the user. The user may be able to determine from the report whether the user wants to be rerouted and/or take other actions to increase or decrease the user's visibility vulnerability. Alternatively, or in addition, whether to reroute the user or take other corrective action may be determined automatically without intervention by the user, for example, based on predetermined criteria. The user may be rerouted 912 based on the visibility to the drone if it is automatically determined or manually indicated that rerouting should occur. The rerouting 912 may be to increase the user's visibility to the drone or to decrease the user's visibility to the drone. The rerouting 912 may take into account the likely future locations of the drone as it travels. Similar methods may be applied to rerouting in response to identifying a ground based imaging system, a potential imaging site, and/or the like. The method 900 may be performed in various orders in different embodiments.

Figure 10:
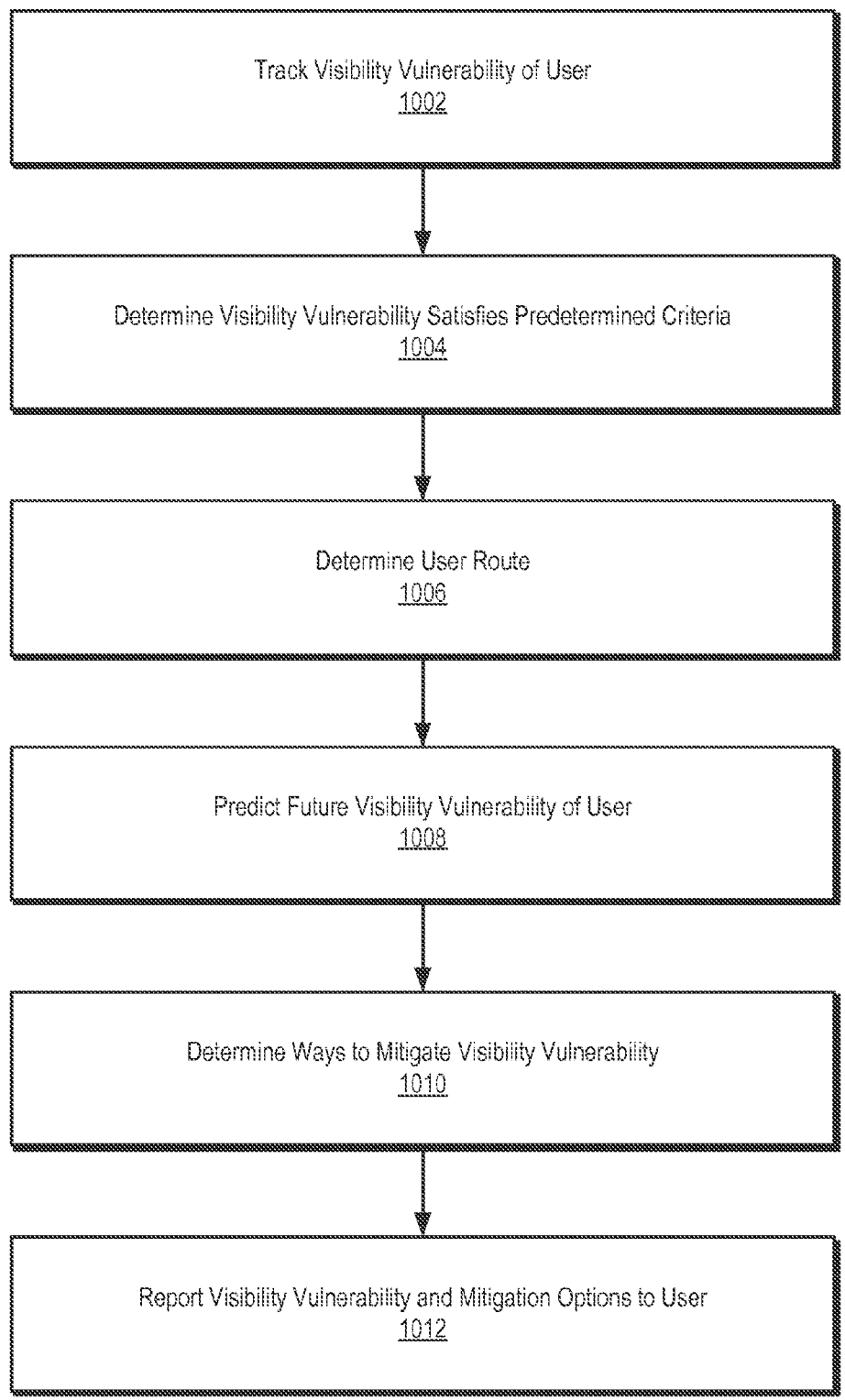
FIG. 10 is a flow diagram of a method for mitigating visibility vulnerability of the user.

FIG. 10 is a flow diagram of a method 1000 for mitigating visibility vulnerability of the user. The method 1000 may begin with tracking 1002 the visibility vulnerability of a user. For example, the visibility vulnerability of the user may be determined over a period of time (e.g., periodically, aperiodically, etc.). The method 1000 may include determining 1004 whether the visibility vulnerability satisfies predetermined criteria. For example, the predetermined criteria may be evaluated each time the visibility vulnerability is updated. The predetermined criteria may include a resolution better than a predetermined threshold, whether an obstruction is present, an identity of an entity to whom the user is visible, and/or the like.

A user route may be determined 1006. The route may include navigation directions, a current velocity (e.g., direction and speed), and/or the like. Determining 1006 the route may include determining that the user is stationary. A future visibility vulnerability of the user may be predicted 1008, for example, based on the user route and/or based on predicted future locations of drones, imaging systems, and/or the like. Ways to mitigate the visibility vulnerability may be determined 1010 based on the user route, based on the predicted future visibility, and/or the like. For example, ways to mitigate present visibility vulnerability and/or ways to mitigate future visibility vulnerability may be determined 1010. When determining 1010 the ways to mitigate the visibility vulnerability, the future visibility vulnerability may be used to determine the visibility vulnerability that is likely to result from different mitigation options (e.g., whether each mitigation option will increase or decrease visibility vulnerability). The mitigation options may include rerouting, continuing along a same route, changing speed, stopping movement and/or not starting movement, and/or the like. Multiple mitigation options may be determined 1010 as well as the likely visibility vulnerability for each option. The visibility vulnerability and mitigation options may be reported 1012 to the user. The user may act upon the reported mitigation options. The method 1000 may be performed in various orders in different embodiments.

While various aspects and embodiments have been disclosed herein, other aspects and embodiments will be apparent to those skilled in the art. As one example, a user may actually want to be imaged by a drone and/or imaging system; accordingly, analogs of the techniques disclosed herein to minimize visibility vulnerability can be employed in order to maximize such a user's visibility vulnerability. The various aspects and embodiments disclosed herein are for purposes of illustration and are not intended to be limiting, with the true scope and spirit being indicated by the following claims.

What is claimed is:

1. A system for reporting vulnerability to ground based imaging, the system comprising:
   a positioning subsystem configured to determine a location of a user;
   a camera detection subsystem configured to determine a location of an imaging system able to view the user;
   a visibility determination subsystem configured to determine a visibility vulnerability of the user to the imaging system based on the location of the user and the location of the imaging system; and
   an output subsystem configured to report the visibility vulnerability to the user.

2. The system of claim 1, wherein the visibility determination subsystem is configured to determine the visibility vulnerability based on an image quality capturable by the imaging system.

3. The system of claim 2, wherein the output subsystem is configured to report the visibility vulnerability by indicating at least one of a type of camera and a type of lens needed to capture the user with a predetermined resolution.

4. The system of claim 2, wherein the output subsystem is configured to report the visibility vulnerability as metrics indicative of aperture-resolution products in a plurality of directions.

5. The system of claim 2, wherein the visibility determination subsystem is configured to determine an imaging capability of the imaging system.

6. The system of claim 2, wherein the visibility determination subsystem is configured to determine the image quality based on a presence of a structure having a view of the user.

7. The system of claim 2, wherein the visibility determination subsystem is configured to determine the image quality based on a range to a structure having a view of the user.

8. The system of claim 2, wherein the visibility determination subsystem is configured to determine the image quality based on a type of a structure having a view of the user.

9. The system of claim 1, wherein the visibility determination subsystem is further configured to determine a viewing aspect of the imaging system, and wherein the visibility vulnerability is based on the viewing aspect.

10. The system of claim 9, wherein the visibility determination subsystem is configured to determine the visibility vulnerability based on an orientation of the user relative to the imaging system.

11. The system of claim 9, wherein the visibility determination subsystem is configured to determine the visibility vulnerability based on whether the user's face is visible.

12. The system of claim 1, wherein the visibility determination subsystem is further configured to determine the visibility vulnerability based on an angle of elevation of the imaging system relative to the user.

13. The system of claim 1, wherein the output subsystem is configured to report sites from which the user is vulnerable.

14. The system of claim 1, wherein the output subsystem is configured to report directions from which the user is vulnerable.

15. The system of claim 1, wherein the visibility determination subsystem is configured to determine the visibility vulnerability based on a real-time position of the user.

16. The system of claim 1, wherein the visibility determination subsystem is configured to determine the visibility vulnerability based on an orientation of the user.

17. The system of claim 1, wherein the output subsystem is configured to report the visibility vulnerability by displaying a plot comprising at least one of a two dimensional circular plot and a three dimensional spherical plot.

18. The system of claim 17, wherein the output subsystem is configured to indicate the visibility vulnerability in a plurality of directions relative to the user with the plot.

19. The system of claim 17, wherein the output subsystem is configured to indicate the visibility vulnerability in a plurality of directions relative to the user's orientation with the plot.

20. The system of claim 17, wherein the output subsystem is configured to display the plot according to a user selected resolution.

21. The system of claim 17, wherein the output subsystem is configured to plot the visibility vulnerability based on an absolute reference space.

22. The system of claim 17, wherein the output subsystem is configured to plot the visibility vulnerability relative to an orientation of the user.

23. A non-transitory computer readable storage medium comprising program code configured to cause a processor to perform a method for reporting vulnerability to ground based imaging, the method comprising:
  determining a location of a user;
  determining a location of an imaging system able to view the user;
  determining a visibility vulnerability of the user to the imaging system based on the location of the user and the location of the imaging system; and
  reporting the visibility vulnerability to the user.

24. The non-transitory computer readable storage medium of claim 23, wherein reporting the visibility vulnerability comprises reporting the visibility vulnerability in response to a query from the user.

25. The non-transitory computer readable storage medium of claim 23, wherein the method further comprises determining future visibility vulnerability of the user to the imaging system.

26. The non-transitory computer readable storage medium of claim 25, wherein the method further comprises determining the future visibility vulnerability based on a route of the user.

27. The non-transitory computer readable storage medium of claim 26, wherein the method further comprises determining the route of the user from a request for directions by the user.

28. The non-transitory computer readable storage medium of claim 23, wherein the method further comprises proposing a route for the user based on the visibility vulnerability of the user to the imaging system.

29. The non-transitory computer readable storage medium of claim 23, wherein the method further comprises reporting one or more ways for the user to decrease the visibility vulnerability to the imaging system.

30. The non-transitory computer readable storage medium of claim 29, wherein reporting the one or more ways for the user to decrease the visibility vulnerability comprises reporting positions with decreased visibility vulnerability.

31. The non-transitory computer readable storage medium of claim 29, wherein reporting the one or more ways for the user to decrease the visibility vulnerability comprises reporting orientations that reduce the visibility vulnerability.

32. The non-transitory computer readable storage medium of claim 23, wherein the method further comprises documenting the visibility vulnerability.

33. The non-transitory computer readable storage medium of claim 32, wherein the method further comprises comparing an image to the documented visibility vulnerability to determine if the image could have been taken by the imaging system at an indicated time.

34. The non-transitory computer readable storage medium of claim 23, wherein determining the visibility vulnerability comprises detecting a presence of the imaging system.

35. The non-transitory computer readable storage medium of claim 34, wherein determining the visibility vulnerability comprises detecting an aim direction of the imaging system.

36. The non-transitory computer readable storage medium of claim 35, wherein detecting the aim comprises detecting a retroreflection from the imaging system.

37. The non-transitory computer readable storage medium of claim 34, wherein detecting the presence of the imaging system comprises visually detecting at least one of a camera and a lens of the imaging system.

38. The non-transitory computer readable storage medium of claim 23, wherein determining the location of the imaging system comprises receiving an indication of the location of the imaging system from a third party.

39. The non-transitory computer readable storage medium of claim 23, wherein determining the location of the imaging system comprises assembling information from a plurality of third parties.

40. The non-transitory computer readable storage medium of claim 23, wherein determining the location of the imaging system comprises receiving a report from the imaging system about its location.

* * * * *